United States Defensive Publication [19] (H) [11] T107001

Staetz [43] Sep. 2, 1986

[54] METHOD FOR CONTROL OF SOIL-BORNE INSECTS EMPLOYING THE PYRETHROID(2-METHYL-[1,1'-BIPHENYL]-3-YL)METHYL 3-(2-CHLORO-3,3,3-TRIFLUORO-1-PROPENYL)-2,2-DIMETHYLCYCLO-PROPANECARBOXYLATE

[76] Inventor: Charles A. Staetz, 85 Hickory La., Newtown, Pa. 18940

[21] Appl. No.: 643,106

[22] Filed: Aug. 22, 1984

Related U.S. Application Data

[63] Continuation of Ser. No. 513,480, Jul. 13, 1983, abandoned.

[51] Int. Cl.[4] ..... A01N 53/00

[52] U.S. Cl. ..... 514/531

[57] ABSTRACT

The compound (2-methyl-[1,1'-biphenyl]-3-yl)methyl 3-(2-chloro-3,3,3-trifluoro-1-propenyl)-2,2-dimethylcyclopropanecarboxylate provides excellent initial and residual control of soil-borne insects when an insecticidal amount of the compound is applied to soil in which plants are or are to be planted. The cis or 1R, cis isomers are preferred for this purpose. The preferred application rate is in the range of 0.25 to 1.5 kg/ha.

2 Claims, No Sheets Drawing,

14 Pages Specification

The file of this unexamined application may be inspected and copies thereof may be purchased (849 O.G. 1221, Apr. 9, 1968).